United States Patent [19]

Urushibata et al.

[11] Patent Number: 5,304,316

[45] Date of Patent: Apr. 19, 1994

[54] DEINKING AGENT FOR REGENERATING WASTE PRINTED PAPER COMPRISING REACTION PRODUCT OF COMPOUND HAVING AN OH GROUP, A DICARBOXYLIC ACID, OR AN ANHYDRIDE THEREOF

[75] Inventors: Hideaki Urushibata; Koji Hamaguchi; Akio Kimura; Shigetoshi Suzue, all of Wakayama, Japan

[73] Assignee: Kao Corporation, Tokyo, Japan

[21] Appl. No.: 946,777

[22] Filed: Sep. 18, 1992

Related U.S. Application Data

[63] Continuation of Ser. No. 632,271, Dec. 21, 1990, abandoned.

[30] Foreign Application Priority Data

Dec. 22, 1989 [JP] Japan .................. 1-333293

[51] Int. Cl.$^5$ .............................................. C09K 3/00
[52] U.S. Cl. ...................................... 252/60; 252/61; 162/4; 162/5
[58] Field of Search ............... 252/60, 61, 174.21, 252/174.23, 174.24; 162/4, 5

[56] References Cited

U.S. PATENT DOCUMENTS

| | | | |
|---|---|---|---|
| 4,360,439 | 11/1982 | Calmanti et al. | 252/61 |
| 4,666,558 | 5/1987 | Wood et al. | 162/5 |
| 4,725,655 | 2/1988 | Denzinger et al. | 252/175 |
| 4,959,123 | 9/1990 | Lehmann et al. | 162/8 |
| 4,964,949 | 10/1990 | Hamaguchi et al. | 252/60 |
| 4,971,656 | 11/1990 | Lehmann et al. | 162/5 |

FOREIGN PATENT DOCUMENTS

| | | |
|---|---|---|
| 2294041 | 12/1988 | European Pat. Off. . |
| 1307024 | 3/1989 | European Pat. Off. . |
| 13401444 | 7/1984 | Fed. Rep. of Germany . |
| 117690 | 7/1982 | Japan . |
| 186592 | 8/1986 | Japan . |
| 182488 | 7/1988 | Japan . |
| 182489 | 7/1988 | Japan . |
| 227880 | 9/1988 | Japan . |

*Primary Examiner*—Prince Willis, Jr.
*Assistant Examiner*—J. Silbermann
*Attorney, Agent, or Firm*—Sughrue, Mion, Zinn, Macpeak & Seas

[57] ABSTRACT

A deinking agent for regenerating waste paper, which comprises a reaction product obtained by reacting a compound having an OH group, which is represented by the following (A) or (B) with a dicarboxylic acid or an anhydride thereof as an active ingredient:

(A) a compound obtained by adding ethylene oxide and propylene oxide to a higher fatty acid having 8 to 22 carbon atoms in such a manner as to control the molar ratio of ethylene oxide/propylene oxide to from 1 to 4 and to control the total amount of the added ethylene oxide and propylene oxide to from 10 to 50 moles on average; or (B) an incomplete ester of a polyhydric alcohol, to which ethylene oxide and propylene oxide have been added in such a manner as to control the molar ratio of ethylene oxide/propylene oxide to from 1 to 4 and to control the total amount of the added ethylene oxide and propylene oxide to from 10 to 50 moles per OH group on average, and a higher fatty acid having 8 to 22 carbon atoms;

is disclosed. With the use of this deinking agent, a deinked pulp having a high degree of whiteness and a small residual ink number can be obtained.

2 Claims, No Drawings

DEINKING AGENT FOR REGENERATING WASTE PRINTED PAPER COMPRISING REACTION PRODUCT OF COMPOUND HAVING AN OH GROUP, A DICARBOXYLIC ACID, OR AN ANHYDRIDE THEREOF

This is a continuation of application Ser. No. 07/632,271 filed Dec. 21, 1990 now abandoned.

FIELD OF THE INVENTION

This invention relates to a deinking agent which is to be used for regenerating waste paper such as used newspapers and magazines. More particularly, it relates to a deinking agent capable of giving deinked pulp of a high degree of whiteness and a small residual ink number when employed in a deinking process of used newspapers and magazines in a flotation or flotation/washing combination system.

BACKGROUND OF THE INVENTION

The regeneration of waste paper such as used newspapers and magazines has been performed for a long time. Recent shortage in pulp resources and a rise in the pulp price have further elevated the importance of the effective utilization of waste paper. Furthermore, the application of deinked pulp has been enlarged and advanced. On the other hand, recent waste paper differs from conventional ones in the printing techniques, printing systems and ingredients of printing inks. Furthermore, waste paper which was never recovered and regenerated is now employed. As a result, the regeneration of the waste paper becomes more and more difficult, from the viewpoint of deinking. In order to promote deinking, therefore, attempts have been made to improve deinking devices.

These attempts comprise, for example, providing a tower aiming at high concentration aging, using a despicer or a kneader for promoting the liberation of an ink through the application of a physical force or providing a high consistency defibering pulper.

Examples of chemicals, which have been employed for separating and removing inks and other impurities from waste paper for a long time, include alkaline agents (for example, caustic soda, sodium silicate, sodium carbonate, sodium phosphate), bleaching agents (for example, hydrogen peroxide, hyposulfite, hypochlorite), sequestering agents (for example, EDTA, DTPA) and deinking agents (for example, anionic surfactants such as alkylbenzenesulfonates, higher alcohols sulfuric acid esters, α-olefinsulfonates, dialkylsulfosuccinates; nonionic surfactants such as ethylene oxide adducts of higher alcohols, alkyl phenols and fatty acids, alkanolamides). One of these substances or a mixture thereof have been used. Although these deinking agents are excellent in foamability at the flotation treatment, they are poor in the ability of collecting inks. In the case of the washing system, furthermore, the detergencies of these deinking agents are limited. In addition, the high foamability causes a trouble of foaming at the drainage step. Therefore, the deinked pulp obtained by using these deinking agents has poor qualities. Even though the resulting deinked pulp has a high degree of whiteness, it looks dark and dull, which reduces the amount of the deinked pulp to be used, for example, in millboard, newspapers. Alternately, in order to reduce darkness and dullness of the resulting deinked pulp, it is required to add a bleaching agent thereto in an elevated amount.

SUMMARY OF THE INVENTION

The present inventors have conducted extensive studies in order to develop a deinking agent for regenerating waste paper which shows an excellent ability of collecting an ink in the flotation treatment and thus give a deinked pulp having a high degree of whiteness, a small residual ink number and a small unliberated ink number. As a result, they have succeeded in the achievement of the present invention.

Accordingly, the present invention provides a deinking agent for regenerating waste paper, which comprises, as an active ingredient, a reaction product obtained by reacting a compound having an OH group, which is represented by the following (A) or (B) or a mixture thereof with a dicarboxylic acid or an anhydride thereof:

(A) a compound obtained by adding ethylene oxide and propylene oxide to a higher fatty acid having 8 to 22 carbon atoms in such a manner as to control the molar ratio of ethylene oxide/propylene oxide to from 1 to 4 and to control the total amount of the added ethylene oxide and propylene oxide to from 10 to 50 moles on average; and (B) an incomplete ester of a polyhydric alcohol, to which ethylene oxide and propylene oxide have been added in such a manner as to control the molar ratio of ethylene oxide/propylene oxide to from 1 to 4 and to control the total amount of the added ethylene oxide and propylene oxide to from 10 to 50 moles per OH group on average, and a higher fatty acid having 8 to 22 carbon atoms.

DETAILED DESCRIPTION OF THE INVENTION

A deinking agent should have the following functions:

(1) lowering the surface tension between cellulose and ink;

(2) inhibiting the re-adhesion of inks liberated from cellulose;

(3) having a high bubble-adsorbability for inks; and (4) having an appropriate foamability.

A deinking agent should provide these four functions in a well-balance.

The compound (A) to be used in the present invention is a compound having one OH group while the incomplete ester (B) to be used in the present invention is a compound having preferably from 1 to 5 OH groups, more preferably from 1 to 2 OH groups.

The molecular weight of the compound (A) and the incomplete ester (B) are preferably from 800 to 40,000, more preferably from 900 to 30,000, and still more preferably from 1,200 to 20,000.

The higher fatty acid to be used in the present invention for the preparation of the compound (A) or the incomplete ester (B) has one carboxyl group and from 8 to 22 carbon atoms, preferably from 16 to 22 carbon atoms. Among these higher fatty acids, a saturated fatty acid is more preferred.

When the higher fatty acid to be used in the present invention for the preparation of the compound (A) or the incomplete ester (B) has less than 8 carbon atoms, the dispersion of an ink liberated from cellulose is promoted and thus the ink is finely divided, which results in a low degree of whiteness of the resulting deinked pulp.

When the number of carbon atoms of the fatty acid exceeds 22, on the other hand, the effect of lowering the cellulose/ink surface tension is weakened, which results in a large amount of unliberated ink and, therefore, a pulp of a poor appearance.

Specific examples of the higher fatty acid include decanoic acid, lauric acid, myristic acid, palmitic acid, stearic acid, oleic acid, elaidic acid, erucic acid, linoleic acid, tallow oil fatty acids, coconut oil fatty acids, palm oil fatty acids and semi-hardened or hardened products thereof. These fatty acids may be used either alone or a mixture of two or more of them.

Among these higher fatty acids, palmitic acid, stearic acid, oleic acid, elaidic acid, erucic acid, linoleic acid, linolenic acid, tallow oil fatty acids, palm oil fatty acids and semi-hardened and hardened products thereof are preferred as well as a mixture of two or more of them, and palmitic acid, stearic acid, tallow oil fatty acids, palm oil fatty acids and semi-hardened and hardened products thereof are more preferred as well as a mixture of two or more of them.

To the higher fatty acid, the ethylene oxide and propylene oxide may be added either via block or random addition, though the latter one is preferable. The ethylene oxide/propylene oxide molar ratio may range from 1 to 4, preferably from 1 to 3. When the molar ratio is smaller than 1, the ink liberated from cellulose is largely dispersed and the capability of the deinking agent of forming a foam layer on the liquid surface in a flotator is low. In this case, therefore, only a small amount of a foam layer carrying the ink can be formed, which causes a low degree of whiteness of the resulting deinked pulp. When the molar ratio exceeds 4, on the other hand, the deinking agent shows a low bubble-adsorbability in the flotator. As a result, the capability of the foam layer of collecting the ink is limited and thus the foam layer shows a pale color. In this case, further, the high capability of forming a foam layer on the liquid surface in the flotator causes significant formation of froth and low foam-breaking properties at a froth pit. These phenomena are highly troublesome from the viewpoint of workability.

The average total mole number of the added ethylene oxide and propylene oxide may range from 10 to 50, preferably from 20 to 35, per active hydrogen atom in the higher fatty acid or the polyhydric alcohol. When the additional mole number is smaller than 10, the liberation of the ink from cellulose and the collection of the liberated ink become difficult, which causes a low degree of whiteness of the resulting deinked pulp. When the additional mole number exceeds 50, on the other hand, the low foam layer-formation ability on the liquid surface in the flotator makes it impossible to discharge the foam layer carrying the collected ink from the system, which causes a low degree of whiteness of the resulting deinked pulp.

The compound (A) can be prepared in a conventional manner as described, for example, in Japanese Patents 1525644 (corresponding to DE-3401444 (OLS)) and 1554913.

The polyhydric alcohol to be used in the present invention for the preparation of the incomplete ester (B) has from 2 to 24 carbon atoms and from 2 to 14 OH groups.

Specific examples of the polyhydric alcohol to be used in the present invention for the preparation of the incomplete ester (B) include ethylene glycol, propylene glycol, glycerol, diglycerol, triglycerol, trimethylolpropane, pentaerythritol and sorbitol.

The incomplete ester (B) may be obtained by adding an alkylene oxide (for example, ethylene oxide, propylene oxide) to the polyhydric alcohol and then esterifying the obtained product with a higher fatty acid. Alternately, it may be obtained by, for example, adding an alkylene oxide to a mixture of a fat and a polyhydric alcohol; or esterifying a polyhydric alcohol with a higher fatty acid and then adding an alkylene oxide thereto. The degree of esterification of the incomplete ester may range from 30 to 90%, preferably from 50 to 75%. When the degree of esterification thereof is less than 30%, the liberation of the ink from cellulose becomes difficult and, as a result, there remains a large amount of unliberated ink. When the degree of esterification exceeds 90%, on the other hand, the ability of collecting the ink in the flotator is deteriorated and, as a result, the degree of whiteness of the resulting deinked pulp is lowered.

A reaction product obtained by reacting the above-mentioned compound (A) or incomplete ester (B) or a mixture thereof with a dicarboxylic acid is the active ingredient of the deinking agent for regenerating waste paper of the present invention.

When the compound (A) and the incomplete ester (B) are used in combination as a mixture thereof, the weight ratio of the compound (A) to the incomplete ester (B) is from 95/5 to 5/95, preferably from 90/10 to 50/50, and more preferably from 80/20 to 60/40.

In the reaction between the compound (A) or the incomplete ester (B) or a mixture thereof and the dicarboxylic acid, it is preferable to use approximately 1 mole of the dicarboxylic acid per residual OH group of the compound (A) or the incomplete ester (B) or a mixture thereof. When the compound (A) or the incomplete ester (B) or a mixture thereof is employed in an extremely larger amount in the aforesaid reaction, the small ability of the ink-collection in the flotator brings about a low degree of whiteness of the resulting deinked pulp. When the dicarboxylic acid is employed in an extremely larger amount, on the other hand, the liberation of the ink from cellulose becomes difficult and thus there remains a large amount of unliberated ink. In this case, the resulting deinked pulp has a poor appearance.

Specific and non-limitative examples of the compound (A) include, for example, POE/POP glycol monostearate (EO $\bar{p}=20$ mole, PO $\bar{p}=10$ mole, block), POE/POP glycol monooleate (EO $\bar{p}=25$ mole, PO $\bar{p}=20$ mole, random), POE/POP glycol monolaurate (EO $\bar{p}=10$ mole, PO $\bar{p}=8$ mole, random), POE/POP glycol monomyristate (EO $\bar{p}=25$ mole, PO $\bar{p}=25$ mole, random), POE/POP glycol monopalmitate (EO $\bar{p}=40$ mole, PO $\bar{p}=10$ mole, block), POE/POP glycol monoelaidate (EO $\bar{p}=10$ mole, PO $\bar{p}=3$ mole, block), POE/-POP glycol monolinolate (EO $\bar{p}=15$ mole, PO $\bar{p}=5$ mole, block), POE/POP glycol mono tallow oil fatty acid ester (EO $\bar{p}=30$ mole, PO $\bar{p}=20$ mole, block), POE/POP glycol mono tallow oil half-hydrogenated fatty acid ester (EO $\bar{p}=20$ mole, PO $\bar{p}=15$ mole, block), POE/POP glycol mono tallow oil hydrogenated fatty acid ester (EO $\bar{p}=12$ mole, PO $\bar{p}=12$ mole, block), POE/POP glycol monococonut oil fatty acid ester (EO $\bar{p}=36$ mole, PO $\bar{p}=14$ mole, block), POE/POP glycol monopalm oil fatty acid ester (EO $\bar{p}=16$ mole, PO $\bar{p}=16$ mole, random).

Among them, POE/POP glycol monostearate (EO $\bar{p}=20$ mole, PO $\bar{p}=10$ mole, block), POE/POP glycol monooleate (EO $\bar{p}$=25 mole, PO $\bar{p}$=20 mole, random), POE/POP glycol monopalmitate (EO $\bar{p}$=40 mole, PO $\bar{p}$=10 mole, block), POE/POP glycol monoelaidate (EO $\bar{p}$=10 mole, PO $\bar{p}$=3 mole, block), POE/POP glycol monolinolate (EO $\bar{p}$=15 mole, PO $\bar{p}$=5 mole, block), POE/POP glycol mono tallow oil fatty acid ester (EO $\bar{p}$=30 mole, PO $\bar{p}$=20 mole, block), POE/POP glycol mono tallow oil half-hydrogenated fatty acid ester (EO $\bar{p}$=20 mole, PO $\bar{p}$=15 mole, block), POE/POP glycol mono tallow oil hydrogenated fatty acid ester (EO $\bar{p}$=12 mole, PO $\bar{p}$=12 mole, block), POE/POP glycol monopalm oil fatty acid ester (EO $\bar{p}$=16 mole, PO $\bar{p}$=16 mole, random) are preferred, and POE/POP glycol monostearate (EO $\bar{p}$=20 mole, PO $\bar{p}$=10 mole, block), POE/POP glycol monopalmitate (EO $\bar{p}$=40 mole, PO $\bar{p}$=10 mole, block), POE/POP glycol monoelaidate (EO $\bar{p}$=10 mole, PO $\bar{p}$=3 mole, block), POE/POP glycol mono tallow oil hydrogenated fatty acid ester (EO $\bar{p}$=12 mole, PO $\bar{p}$=12 mole, block) are more preferred.

Specific and non-limitative examples of the incomplete ester (B) include, for example, POE/POP glycerol distearate (EO $\bar{p}$=60 mole, PO $\bar{p}$=30 mole, random), POE/POP glycol oleate (EO $\bar{p}$=25 mole, PO $\bar{p}$=10 mole, block, degree of esterification: 50%), POE/POP glycerol stearate (EO $\bar{p}$=60 mole, PO $\bar{p}$=50 mole, random, degree of esterification: 40%), POE/POP trimethylolpropane distearate (EO $\bar{p}$=75 mole, PO $\bar{p}$=60 mole, random), POE/POP glycerol oleate/stearate (EO $\bar{p}$=45 mole, PO $\bar{p}$=15 mole, block, degree of esterification: 75%), POE/POP pentaerythritol laurate (EO $\bar{p}$=80 mole, PO $\bar{p}$=60 mole, random, degree of esterification: 40%), POE/POP trimethylolpropane oleate (EO $\bar{p}$=50 mole, PO $\bar{p}$=40 mole, random, degree of esterification: 60%), POE/POP sorbitol oleate (EO $\bar{p}$=100 mole, PO $\bar{p}$=60 mole, block, degree of esterification: 70%), POE/POP sorbitan stearate (EO $\bar{p}$=100 mole, PO $\bar{p}$=80 mole, random, degree of esterification: 60%), POE/POP glycerol laurate (EO $\bar{p}$=90 mole, PO $\bar{p}$=30 mole, random, degree of esterification: 30%), POE/POP diglycerol laurate (EO $\bar{p}$=80 mole, PO $\bar{p}$=60 mole, random, degree of esterification: 60%), POE/POP glycerol stearate (EO $\bar{p}$=75 mole, PO $\bar{p}$=40 mole, random, degree of esterification: 70%), POE/POP adduct of tallow oil/glycerol (1/0.5 mole) mixture (EO $\bar{p}$=60 mole, PO $\bar{p}$=27 mole, random), POE/POP adduct of hydrogenated tallow oil/glycerol (1/0.15 mole) mixture (EO $\bar{p}$=40 mole, PO $\bar{p}$=20 mole, block), POE/POP adduct of hydrogenated coconut oil/glycerol (1/0.3 ml) mixture (EO $\bar{p}$=90 mole, PO $\bar{p}$=30 mole, block).

Among them, POE/POP glycerol distearate (EO $\bar{p}$=60 mole, PO $\bar{p}$=30 mole, random), POE/POP glycol oleate (EO $\bar{p}$=25 mole, PO $\bar{p}$=10 mole, block, degree of esterification: 50%), POE/POP glycerol stearate (EO $\bar{p}$=60 mole, PO $\bar{p}$=50 mole, random, degree of esterification: 40%), POE/POP trimethylolpropane distearate (EO $\bar{p}$=75 mole, PO $\bar{p}$=60 mole, random), POE/POP glycerol oleate/stearate (EO $\bar{p}$=45 mole, PO $\bar{p}$=15 mole, block, degree of esterification: 75%), POE/POP trimethylolpropane oleate (EO e,ovs/p/ =50 mole, PO $\bar{p}$=40 mole, random, degree of esterification: 60%), POE/POP sorbitol oleate (EO $\bar{p}$=100 mole, PO $\bar{p}$=60 mole, block, degree of esterification: 70%), POE/POP sorbitan stearate (EO $\bar{p}$=100 mole, PO $\bar{p}$=80 mole, random, degree of esterification: 60%), POE/POP glycerol stearate (EO $\bar{p}$=75%), mole, PO $\bar{p}$=40 mole, random, degree of esterification: 70%), POE/POP adduct of tallow oil/glycerol (1/0.5 mole) mixture (EO $\bar{p}$=60 mole, PO $\bar{p}$=27 mole, random), POE/POP adduct of hydrogenated tallow oil/glycerol (1/0.15 mole) mixture (EO $\bar{p}$=40 mole, PO $\bar{p}$=20 mole, block), POE/POP adduct of hydrogenated coconut oil/glycerol (1/0.3 mole) mixture (EO $\bar{p}$=90 mole, PO $\bar{p}$=30 mole, block) are preferred and POE/POP glycerol distearate (EO $\bar{p}$=60 mole, PO $\bar{p}$=30 mole, random), POE/POP sorbitan stearate (EO $\bar{p}$=100 mole, PO $\bar{p}$=80 mole, random, degree of esterification: 60%), POE/POP glycerol stearate (EO $\bar{p}$=75 mole, PO $\bar{p}$=40 mole, random, degree of esterification: 70%), POE/POP adduct of hydrogenated tallow oil/glycerol (1/0.15 mole) mixture (EO $\bar{p}$=40 mole, PO $\bar{p}$=20 mole, block), POE/POP adduct of hydrogenated coconut oil/glycerol (1/0.3 mole) mixture (EO $\bar{p}$=90 mole, PO$\bar{p}$=30 mole, block) are more preferred.

Among the compound (A) and the incomplete ester (B), the incomplete ester (B) are preferred.

The dicarboxylic acid to be used for the preparation of the deinking agent of the present invention includes aliphatic dicarboxylic acids and cyclic dicarboxylic acids. Among them, aliphatic dicarboxylic acids are preferred. Specific examples of the dicarboxylic acid include oxalic acid, succinic acid, maleic acid, glutaric acid, adipic acid and phthalic acid. When these dicarboxylic acids form anhydrides, it is preferable to use these anhydrides. Examples of the anhydrides include maleic anhydride, succinic anhydride, glutaric anhydride and phthalic anhydride.

The deinking agent for regenerating waste paper of the present invention may be prepared by an arbitrary method without restriction. It may be prepared by mixing the aforesaid compound (A) or incomplete ester (B) or a mixture thereof having an OH group with a dicarboxylic acid or an anhydride thereof upon heating. Examples of such a preparation process include those described in JP-B-46-41887 (corresponding to U.S. Pat. No. 3,322,703), JP-B-60-33098, U.S. Pat. No. 2,316,234 (1943), U.S. Pat. No. 2,028,091 (1936), J. Chem. Soc. Japan, 2, pp 261–265 (1976), Hiroshi Horiguchi, *Gosei Kaimenkasseizai (Synthesized Surface Active Aqent)*, revised and enlarged edition, pp 203–204, Sankyo Shuppan K.K. (1970) and Yukagaku, 26 (5), pp 283–286 (1977) (The term "JP-B" as used herein means an "examined Japanese patent publication"). In particular, such a preparation process is preferably conducted at a reaction temperature of from 80° to 200° C. (in the case where a dicarboxylic acid anhydride is used, a temperature of from 80° to 110° C. is preferred, while in the case where a dicarboxylic acid is used, a temperature of from 150° to 200° C. is preferred) under the presence of a catalyst in an amount of from 0 to 5% by weight based on the total weight of all starting materials for a reaction time of from 8 to 12 hours.

The molecular weight of the deinking agent for regenerating waste pulp of the present invention is preferably from 950 to 40,000.

The deinking agent for regenerating waste paper of the present invention may be added by portions at either one or each of the waste paper-defibering step, kneader-treatment step, aging-tower step and flotation step. However the highest effect may be achieved by adding it at the waste paper-defibering step. It is preferable to add the deinking agent in an amount of from 0.05 to 1.0% by weight based on the waste paper material.

To further illustrate the present invention, and not by way of limitation, the following Examples will be given.

Unless otherwise specified, all percents given to the compounds are by weight.

PRODUCTION EXAMPLE 1

To a four-necked flask (1 l), were fed 567.7 g of polyoxyethylene/polyoxypropylene (hereinafter simply referred to as POE/POP) glycol monostearate (EO $\bar{p}$=20 mole, PO $\bar{p}$=10 mole, block polymerization (EO: ethylene oxide, PO: propylene oxide, $\bar{p}$: additional mole number); the abbreviations will apply hereinafter), 29.3 g of succinic anhydride and 3.0 g of sodium acetate which was used as a catalyst. The resulting mixture was then allowed to react at a reaction temperature of 100° C. while stirring at a rate of 500 rpm under a nitrogen atmosphere for 10 hours.

PRODUCTION EXAMPLE 2

To four-necked flask (1 l), were fed 571.9 g of a material obtained by obtained by random-polymerizing 60 moles of EO and 27 moles of PO with a mixture of tallow oil and glycerol (molar ratio: 1:0.5) and 28.1 g of maleic anhydride. The resulting mixture was then allowed to react at a reaction temperature of 100° C. while stirring at a rate of 500 rpm under a nitrogen atmosphere for 10 hours.

PRODUCTION EXAMPLE 3

To a four-necked flask (1 l), were fed 580.9 g of POE/POP trimethylolpropane ester (EO $\bar{p}$=75 mole, PO $\bar{p}$=60 mole, random polymerization), 16.1 g of maleic anhydride and 3.0 g of sodium hydroxide. The resulting mixture was then allowed to react at a reaction temperature of 110° C. while stirring at a rate of 500 rpm under a nitrogen atmosphere for 12 hours

EXAMPLE 1

Marketed waste newspapers were cut into pieces of 2×5 cm. A definite amount of these pieces were fed into a portable defibering machine and then water, 1.0% (by weight; the same will apply hereinafter), based on the waste newspaper pieces, caustic soda, 3.0%, based on the waste newspaper pieces, of sodium silicate, 3.0%, based on the waste newspaper pieces, of a 30% aqueous solution of hydrogen peroxide and 0.4%, based on the waste newspaper pieces, of each deinking agent as specified in Table 1 were fed thereto. After defibering at a pulp concentration of 5% at 55° C. for 20 minutes, the mixture was aged at 50° C. for 60 minutes. Next, water was added thereto to thereby lower the pulp concentration to 1.0%. Then 1.0%, based on the waste newspaper pieces, of $CaCl_2$ was added thereto and the resulting mixture was subjected to flotation at 30° C. for 10 minutes. After the completion of the flotation, the pulp slurry was concentrated to give a concentration of 6% and then diluted with water to thereby give a concentration of 1%. After treating with a TAPPI sheet machine, a pulp sheet was obtained. The whiteness of the obtained pulp sheet was then measured with a colormeter (diffusion/reflection type) while the total residual ink number and unliberated ink number were determined with an image analyzer (×100). Further, the height of the foam layer on the liquid surface in the flotator was determined 3 minutes after the initiation of the flotation.

Table 2 shows the results.

TABLE 1

| | Compound | Acid Anhydride | Ratio of Compound to Acid Anhydride*[1] |
|---|---|---|---|
| Product of the Invention 1 | POE/POP glycol monostearate (EO $\bar{p}$ = 20 mole, PO $\bar{p}$ = 10 mole, block, Production Example 1) | succinic anhydride | 1:0.9 |
| Product of the Invention 2 | POE/POP glycol monooleate (EO $\bar{p}$ = 25 mole, PO $\bar{p}$ = 20 mole, random) | glutaric anhydride | 1:0.8 |
| Product of the Invention 3 | POE/POP glycol monolaurate (EO $\bar{p}$ = 10 mole, PO $\bar{p}$ = 8 mole, random) | phthalic anhydride | 1:1.2 |
| Product of the Invention 4 | POE/POP glycerol distearate (EO $\bar{p}$ = 60 mole, PO $\bar{p}$ = 30 mole, random) | maleic anhydride | 1:1.1 |
| Comparative Product 5 | POE/POP glycol monostearate (EO $\bar{p}$ = 7 mole, PO $\bar{p}$ = 10 mole, block) | succinic anhydride | 1:0.9 |
| Comparative Product 6 | POE/POP glycol monostearate (EO $\bar{p}$ = 20 mole, PO $\bar{p}$ = 4 mole, block) | succinic anhydride | 1:0.9 |
| Comparative Product 7 | POE/POP glycol monostearate (EO $\bar{p}$ = 5 mole, PO $\bar{p}$ = 3 mole, block) | succinic anhydride | 1:0.9 |
| Comparative Product 8 | POE/POP glycol monostearate (EO $\bar{p}$ = 40 mole, PO $\bar{p}$ = 20 mole, block) | succinic anhydridge | 1:0.9 |
| Comparative Product 9 | POE/POP glycerol distearate (EO $\bar{p}$ = 60 mole, PO $\bar{p}$ = 30 mole, random) | maleic anhydride | 1:0.3 |
| Comparative Product 10 | POE/POP glycerol distearate (EO $\bar{p}$ = 60 mole, PO $\bar{p}$ = 30 mole, random) | maleic anhydride | 1:1.6 |
| Comparative Product 11 | POE/POP glycerol distearate (EO $\bar{p}$ = 20 mole, PO $\bar{p}$ = 30 mole, random) | maleic anhydride | 1:1.1 |
| Comparative Product 12 | POE/POP glycerol distearate (EO $\bar{p}$ = 20 mole, PO $\bar{p}$ = 5 mole, random) | maleic anhydride | 1:1.1 |
| Comparative Product 13 | POE/POP glycerol stearate (EO $\bar{p}$ = 60 mole, PO $\bar{p}$ = 30 mole, random, degree of esterification = 95%) | maleic anhydride | 1:1.1 |
| Comparative Product 14 | POE/POP glycerol stearate (EO $\bar{p}$ = 60 mole, PO $\bar{p}$ = 30 mole, random, degree of esterification = 20%) | maleic anhydride | 1:1.1 |
| Comparative Product 15 | POE/POP glycerol ether (EO $\bar{p}$ = 60 mole, PO $\bar{p}$ = 30 mole, random) | maleic anhydride | 1:1.1 |
| Comparative Product 16 | ammonium stearate | — | — |
| Comparative Product 17 | POE/nonyl phenyl ether (EO $\bar{p}$ = 9 mole) | — | — |

Note:
*[1]"Ratio of compound to acid anhydride" means the ratio of acid anhydride per mole of residual OH group in the compound.

TABLE 2

| | Degree of Whiteness (%) | Total Residual Ink Number (number/1 field) | Unliberated Ink Number (number/1 field) | Foam-Height |
|---|---|---|---|---|
| Product of the Invention 1 | 56.0 | 41 | 20 | 3.5 |
| Product of the Invention 2 | 55.7 | 47 | 21 | 2.8 |
| Product of the Invention 3 | 55.3 | 53 | 25 | 2.6 |
| Product of the Invention 4 | 56.5 | 37 | 17 | 3.3 |
| Comparative Product 5 | 52.0 | 98 | 25 | 0.9 |
| Comparative Product 6 | 52.8 | 79 | 23 | 5.7 |
| Comparative Product 7 | 50.2 | 123 | 21 | 0.5 |
| Comparative Product 8 | 53.0 | 75 | 23 | 1.0 |
| Comparative Product 9 | 52.9 | 70 | 23 | 3.2 |
| Comparative Product 10 | 53.3 | 62 | 39 | 3.0 |
| Comparative Product 11 | 52.5 | 83 | 22 | 0.7 |
| Comparative Product 12 | 52.0 | 107 | 25 | 1.5 |
| Comparative Product 13 | 53.7 | 71 | 20 | 3.5 |
| Comparative Product 14 | 52.3 | 87 | 47 | 3.0 |
| Comparative Product 15 | 50.0 | 130 | 37 | 3.2 |
| Comparative Product 16 | 48.0 | 143 | 98 | 0.8 |
| Comparative Product 17 | 47.3 | 165 | 38 | 5.0 |

EXAMPLE 2

Marketed waste newspapers were cut into pieces of 2×5 cm. A definite amount of these pieces were fed into a portable defibering machine and then water, 1.0%, based on the waste newspaper pieces, of caustic soda, 0.5%, based on the waste newspaper pieces, of sodium silicate No. 3 and 0.4%, based on the waste newspaper pieces, of each deinking agent as specified in Table 3 were fed thereto. After defibering at a pulp concentration of 5% at 45° C. for 20 minutes, the mixture was dehydrated to thereby adjust the pulp concentration to 18%. Then 1.5%, based on the waste newspaper pieces, of caustic soda, 2.5%, based on the waste newspaper pieces, of sodium silicate No. 3 and 3.0%, based on the waste newspaper pieces, of a 30% aqueous solution of hydrogen peroxide were added thereto. After mixing, the resulting mixture was aged at a pulp concentration of 15% at 50° C. for 90 minutes. Next, water was added to thereby lower the pulp concentration to 4%. Then the mixture was further defibered in a portable defibering machine for 5 minutes and water was added to thereby lower the pulp concentration to 1.0%. 1.0%, based on the waste newspaper pieces, of $CaCl_2$ was added thereto and the resulting mixture was subjected to flotation at 30° C. for 10 minutes. After the completion of the flotation, the pulp slurry was concentrated to give a concentration of 6% and then diluted with water to thereby give a concentration of 1%. After treating with a TAPPI sheet machine, a pulp sheet was obtained. The whiteness of the obtained pulp sheet was then measured with a colormeter (diffusion/reflection type) while the total residual ink number and unliberated ink number were determined with an image analyzer (×100). Further, the height of the foam layer on the liquid surface in the flotator was determined 3 minutes after the initiation of the flotation.

Table 4 shows the results.

TABLE 3

| | Compound | Acid Anhydride | Ratio of Compound to Acid Anhydride*[1] |
|---|---|---|---|
| Product of the Invention 18 | POE/POP adduct of tallow oil/glycerol (1/0.5 mole) mixture (EO p = 60 mole, PO p = 27 mole, random, Production Example 2) | maleic anhydride | 1:1 |
| Product of the Invention 19 | POE/POP sorbitol oleate (EO p = 100 mole, PO p = 60 mole, block, degree of esterification: 70%) | succinic anhydride | 1:1.1 |
| Product of the Invention 20 | POE/POP sorbitan stearate (EO p = 100 mole, PO p = 80 mole, random, degree of esterification: 60%) | maleic anhydride | 1:1.2 |
| Product of the Invention 21 | POE/POP glycerol laurate (EO p = 90 mole, PO p = 30 mole, random, degree of esterification: 30%) | succinic anhydride | 1:0.8 |
| Comparative Product 22 | POE/POP adduct of tallow oil/glycerol (1/0.5 mole) mixture (EO p = 15 mole, PO p = 7 mole, random) | maleic anhydride | 1:1 |
| Comparative Product 23 | POE/POP adduct of tallow oil/glycerol (1/0.5 mole) mixture (EO p = 160 mole, PO p = 72 mole, random) | maleic anhydride | 1:1 |
| Comparative Product 24 | POE/POP adduct of tallow oil/glycerol (1/0.5 mole) mixture (EO p = 40 mole, PO p = 47 mole, random) | maleic anhydride | 1:1 |
| Comparative Product 25 | POE/POP adduct of tallow oil/glycerol (1/0.5 mole) mixture (EO p = 75 mole, PO p = 12 mole, random) | maleic anhydride | 1:1 |
| Comparative Product 26 | POE/POP adduct of tallow oil/glycerol (1/0.5 mol) mixture (EP p = 60 mole, PO p = 27 mole, random) | maleic anhydride | 1:0.3 |
| Comparative Product 27 | POE/POP adduct of tallow oil/glycerol (1/0.5 mol) mixture (EO p = 60 mole, PO p = 27 mole, random) | maleic anhydride | 1:1.5 |
| Comparative Product 28 | POE/POP sorbitol oleate (EO p = 36 mole, PO p = 18 mole, block, degree of esterification: 70%) | succinic anhydride | 1:1.1 |
| Comparative Product 29 | POE/POP sorbitol oleate (EO p = 250 mole, PO p = 90 mole, block, degree of esterification: 70%) | succinic anhydride | 1:1.1 |
| Comparative Product 30 | POE/POP sorbitol oleate (EO p = 100 mole, PO p = 60 mole, block, degree of esterification: 95%) | succinic anhydride | 1:1.1 |
| Comparative Product 31 | POE/POP sorbitol oleate (EO p = 100 mole, PO p = 60 mole, block, degree of esterification: 20%) | succinic anhydride | 1:1.1 |
| Comparative | POE/POP sorbitol ether | — | — |

TABLE 3-continued

| | Compound | Acid Anhydride | Ratio of Compound to Acid Anhydride[1] |
|---|---|---|---|
| Product 32 Comparative Product 33 | (EO p̄ = 100 mole, PO p̄ = 60 mole, block) sodium dodecylbenzensulfonate | succinic anhydride | 1:1.1 |

Note;
[1]"Ratio of compound to acid anhydride" means the ratio of acid anhydride per mole of residual OH group in the compound.

TABLE 4

| | Degree of Whiteness (%) | Total Residual Ink Number (number/1 field) | Unliberated Ink Number (number/1 field) | Foam-Height |
|---|---|---|---|---|
| Product of the Invention 18 | 57.3 | 38 | 20 | 3.0 |
| Product of the Invention 19 | 56.2 | 45 | 23 | 2.9 |
| Product of the Invention 20 | 57.0 | 39 | 18 | 3.3 |
| Product of the Invention 21 | 56.0 | 50 | 25 | 3.6 |
| Comparative Product 22 | 52.5 | 94 | 23 | 1.2 |
| Comparative Product 23 | 53.3 | 79 | 27 | 0.7 |
| Comparative Product 24 | 53.0 | 83 | 22 | 0.9 |
| Comparative Product 25 | 52.4 | 90 | 20 | 5.3 |
| Comparative Product 26 | 52.9 | 89 | 23 | 2.3 |
| Comparative Product 27 | 52.1 | 105 | 46 | 2.5 |
| Comparative Product 28 | 53.0 | 85 | 30 | 2.0 |
| Comparative Product 29 | 53.5 | 75 | 25 | 1.3 |
| Comparative Product 30 | 53.3 | 78 | 21 | 2.5 |
| Comparative Product 31 | 52.7 | 90 | 53 | 3.0 |
| Comparative Product 32 | 51.0 | 123 | 33 | 3.7 |
| Comparative Product 33 | 50.3 | 139 | 55 | 6.4 |

EXAMPLE 3

Marketed waste magazines were cut into pieces of 2×5 cm. A definite amount of these pieces were fed into a low-concentration pulper and then water, 0.5%, based on the waste newspaper pieces, of caustic soda, 1.5%, based on the waste newspaper pieces, of sodium silicate No. 3, 1.0%, based on the waste newspaper pieces, of a 30% aqueous solution of hydrogen peroxide and 0.05%, based on the waste newspaper pieces, of each deinking agent as specified in Table 5 were fed thereto. After defibering at a pulp concentration of 15% at 45° C. for 20 minutes, water was added thereto to thereby lower the pulp concentration to 4.0%. Then water was further added to thereby lower the pulp concentration to 1.0%. Next, the mixture was subjected to flotation at 30° C. for 10 minutes. After the completion of the flotation, the pulp slurry was concentrated to give a concentration of 6% and then diluted with water to thereby give a concentration of 1%. After treating with a TAPPI sheet machine, a pulp sheet was obtained.

The whiteness of the obtained pulp sheet was then measured with a colormeter (diffusion/reflection type) while the total residual ink number and unliberated ink number were determined with an image analyzer (×100). Further, the height of the foam layer on the liquid surface in the flotator was determined at 3 minutes after the initiation of the flotation.

Table 6 shows the results.

TABLE 5

| | Compound | Acid Anhydride | Ratio of Compound to Acid Anhydride[1] |
|---|---|---|---|
| Product of the Invention 34 | POE/POP trimethylolpropane distearate (EO p = 75 mole, PO p = 60 mole, random, Production Example 3) | maleic anhydride | 1:1.05 |
| Product of the Invention 35 | POE/POP glycerol oleate/stearate (EO p = 45 mole, PO p = 15 mole, block, degree of esterification: 75%) | glutaric anhydride | 1:0.8 |
| Product of the Invention 36 | POE/POP pentaerythritol laurate (EO p = 80 mole, PO p = 60 mole, random, degree of esterification: 40%) | succinic anhydride | 1:1.2 |
| Product of the Invention 37 | POE/POP trimethylolpropane oleate (EO p = 50 mole, PO p = 40 mole, random, degree of esterification: 60%) | phthalic anhydride | 1:1.0 |
| Comparative Product 38 | POE/POP trimethylolpropane distearate (EO p = 110 mole, PO p = 25 mole, random) | maleic anhydride | 1:1.05 |
| Comparative Product 39 | POE/POP trimethylolpropane distearate (EO = 60 mole, PO = 75 mole, random) | maleic anhydride | 1:1.05 |
| Comparative Product 40 | POE/POP trimethylolpropane distearate (EO p = 15 mole, PO p = 12 mole, random) | maleic anhydride | 1:1.05 |
| Comparative | POE/POP trimethylolpropane distearate | maleic | 1:1.05 |

TABLE 5-continued

| | Compound | Acid Anhydride | Ratio of Compound to Acid Anhydride*1) |
|---|---|---|---|
| Product 41 | (EO p̄ = 90 mole, PO p̄ = 72 mole, random) | anhydride | |
| Comparative Product 42 | POE/POP pentaerythritol laurate (EO p = 20 mole, PO p = 15 mole, random, degree of esterification: 40%) | succinic anhydride | 1:1.2 |
| Comparative Product 43 | POE/POP pentaerythritol laurate (EO p = 120 mole, PO p = 60 mole, random, degree of esterification: 40%) | succinic anhydride | 1:1.2 |
| Comparative Product 44 | POE/POP pentaerythritol laurate (EO p̄ = 80 mole, PO p = 60 mole, random, degree of esterification: 40%) | succinic anhydride | 1:0.3 |
| Comparative Product 45 | POE/POP pentaerythritol laurate (EO p̄ = 80 mole, PO p = 60 mole, random, degree of esterification: 40%) | succinic anhydride | 1:1.7 |
| Comparative Product 46 | POE/POP trimethylolpropane ether (EO p = 75 mole, PO p = 60 mole, random) | maleic anhydride | 1:1.05 |
| Comparative Product 47 | sodium α-olefinsulfonate | — | — |
| Comparative Product 48 | sodium oleate | — | — |

Note:
*1)"Ratio of compound to acid anhydride" means the ratio of acid anhydride per mole of residual OH group in the compound.

TABLE 6

| | Degree of Whiteness (%) | Total Residual Ink Number (number/1 field) | Unliberated Ink Number (number/1 field) | Foam-Height |
|---|---|---|---|---|
| Product of the Invention 34 | 54.7 | 37 | 24 | 3.3 |
| Product of the Invention 35 | 55.5 | 30 | 17 | 3.1 |
| Product of the Invention 36 | 54.0 | 45 | 28 | 3.0 |
| Product of the Invention 37 | 54.5 | 39 | 22 | 3.5 |
| Comparative Product 38 | 52.1 | 79 | 27 | 5.2 |
| Comparative Product 39 | 51.9 | 90 | 25 | 0.7 |
| Comparative Product 40 | 51.0 | 104 | 29 | 0.4 |
| Comparative Product 41 | 52.3 | 83 | 27 | 1.0 |
| Comparative Product 42 | 51.3 | 100 | 33 | 0.6 |
| Comparative Product 43 | 52.7 | 77 | 35 | 1.2 |
| Comparative Product 44 | 52.3 | 70 | 30 | 3.3 |
| Comparative Product 45 | 51.5 | 89 | 57 | 3.0 |
| Comparative Product 46 | 50.3 | 127 | 29 | 3.7 |
| Comparative Product 47 | 49.8 | 133 | 60 | 5.9 |
| Comparative Product 48 | 49.0 | 140 | 82 | 0.7 |

EXAMPLE 4

Marketed waste magazines were cut into pieces of 2×5 cm. A definite amount of these pieces were fed into a low-concentration pulper and then water, 0.5%, based on the waste newspaper pieces, of caustic soda, 1.0%, based on the waste newspaper pieces, of sodium silicate No. 3, 0.8%, based on the waste newspaper pieces, of a 30% aqueous solution of hydrogen peroxide, 0.05% of a chelating agent (DTPA) and 0.06%, based on the waste newspaper pieces, of each deinking agent as specified in Table 7 were fed thereto. After defibering at a pulp concentration of 4% at 40° C. for 15 minutes, water was added thereto to thereby lower the pulp concentration to 1.0%. Then the mixture was subjected to flotation at 30° C. for 10 minutes. After the completion of the flotation, the pulp slurry was concentrated to give a concentration of 6% and then diluted with water to thereby give a concentration of 1%. After treating with a TAPPI sheet machine, a pulp sheet was obtained.

The whiteness of the obtained pulp sheet was then measured with a colormeter (diffusion/reflection type) while the total residual ink number and unliberated ink number were determined with an image analyzer (×100). Further, the height of the foam layer on the liquid surface in the flotator was determined at 3 minutes after the initiation of the flotation.

Table 8 shows the results.

TABLE 7

| | Compound | Acid Anhydride | Ratio of Compound to Acid Anhydride*1) |
|---|---|---|---|
| Product of the Invention 49 | POE/POP diglycerol laurate (EO p̄ = 80 mole, PO p̄ = 60 mole, random, degree of esterification: 60%) | oxalic acid | 1:0.8 |
| Product of the Invention 50 | POE/POP glycerol stearate (EO p = 75 mole, PO p̄ = 40 mole, random, degree of esterification: 70%) | maleic acid | 1:1.1 |
| Product of the Invention 51 | POE/POP glycol oleate (EO p = 25 mole, PO p̄ = 10 mole, block, degree of esterification: 50%) | succinic acid | 1:1.0 |
| Product of the Invention 52 | POE/POP glycerol stearate (EO p = 60 mole, PO p̄ = 50 mole, random, degree of esterification: 40%) | adipic acid | 1:0.9 |
| Comparative | POE/POP glycerol stearate (EO p = 15 mole, PO p̄ = | maleic acid | 1:1.1 |

TABLE 7-continued

| | Compound | Acid Anhydride | Ratio of Compound to Acid Anhydride*[1] |
|---|---|---|---|
| Product 53 | 8 mole, random, degree of esterification: 70%) | | |
| Comparative Product 54 | POE/POP glycerol stearate (EO p = 120 mole, PO p = 64 mole, random, degree of esterification: 70%) | maleic acid | 1:1.1 |
| Comparative Product 55 | POE/POP glycerol stearate (EO p = 96 mole, PO p = 19 mole, random, degree of esterification: 70%) | maleic acid | 1:1.1 |
| Comparative Product 56 | POE/POP glycerol stearate (EO p = 55 mole, PO p = 60 mole, random, degree of esterification: 70%) | maleic acid | 1:1.1 |
| Comparative Product 57 | POE/POP glycerol stearate (EO p = 75 mole, PO p = 40 mole, random, degree of esterification: 70%) | maleic acid | 1:1.1 |
| Comparative Product 58 | POE/POP glycerol stearate (EO p = 75 mole, PO p = 40 mole, random, degree of esterification: 70%) | maleic acid | 1:0.4 |
| Comparative Product 59 | POE/POP glycol oleate (EO p = 40 mole, PO p = 16 mole, block, degree of esterification: 50%) | succinic acid | 1:1.0 |
| Comparative Product 60 | POE/POP glycol oleate (EO p = 5 mole, PO p = 2 mole, block, degree of esterification: 50%) | succinic acid | 1:1.0 |
| Comparative Product 61 | POE/POP glycol oleate (EO p = 25 mole, PO p = 10 mole, block, degree of esterification: 80%) | succinic acid | 1:1.0 |
| Comparative Product 62 | POE/POP glycol oleate (EO p = 25 mole, PO p = 10 mole, block, degree of esterification: 20%) | succinic acid | 1:1.0 |
| Comparative Product 63 | POE/POP glycerol ether (EO p = 60 mole, PO p = 50 mole, random) | adipic acid | 1:0.9 |
| Comparative Product 64 | POE/POP glycerol hexylate (EO p = 60 mole, PO p = 50 mole, random, degree of esterification: 40%) | adipic acid | 1:0.9 |
| Comparative Product 65 | POE lauryl ether (EO p = 10 mole) | — | — |

Note;
*[1] "Ratio of compound to acid anhydride" means the ratio of acid anhydride per mole of residual OH group in compound.

TABLE 8

| | Degree of Whiteness (%) | Total Residual Ink Number (number/1 field) | Unliberated Ink Number (number/1 field) | Foam-Height |
|---|---|---|---|---|
| Product of the Invention 49 | 55.7 | 41 | 27 | 3.3 |
| Product of the Invention 50 | 56.4 | 35 | 23 | 3.0 |
| Product of the Invention 51 | 54.9 | 49 | 31 | 3.5 |
| Product of the Invention 52 | 55.9 | 40 | 25 | 2.8 |
| Comparative Product 53 | 52.4 | 93 | 33 | 2.0 |
| Comparative Product 54 | 53.4 | 73 | 35 | 0.9 |
| Comparative Product 55 | 53.1 | 78 | 33 | 4.9 |
| Comparative Product 56 | 52.9 | 89 | 28 | 1.0 |
| Comparative Product 57 | 52.4 | 89 | 47 | 2.7 |
| Comparative Product 58 | 52.7 | 80 | 29 | 3.0 |
| Comparative Product 59 | 52.3 | 90 | 36 | 0.8 |
| Comparative Product 60 | 51.7 | 97 | 33 | 0.5 |
| Comparative Product 61 | 53.3 | 65 | 32 | 3.3 |
| Comparative Product 62 | 52.9 | 75 | 49 | 3.0 |
| Comparative Product 63 | 50.3 | 109 | 56 | 3.7 |
| Comparative Product 64 | 51.0 | 103 | 34 | 2.2 |
| Comparative Product 65 | 50.0 | 118 | 33 | 3.8 |

While the invention has been described in detail and with reference to specific examples thereof, it will be apparent to one skilled in the art that various changes and modifications can be made therein without departing from the spirit and scope thereof.

What is claimed is:

1. A deinking agent for regenerating waste paper, which comprises a reaction product obtained by reacting (a) a compound having an OH group, which is represented by the following compound (A) or incomplete ester (B) or a mixture thereof, with (b) a dicarboxylic acid or an anhydride thereof as an active ingredient, wherein said dicarboxylic acid anhydride is selected from the group consisting of maleic anhydride, succinic anhydride, glutaric anhydride and phthalic anhydride and approximately 1 mole of said dicarboxylic acid is used per residual OH group of compound (A) or incomplete ester (B):

(A) a compound obtained by adding ethylene oxide and propylene oxide to a higher fatty acid having 8 to 22 carbon atoms in such a manner as to control the molar ratio of ethylene oxide/propylene oxide to from 1 to 4 and to control the total amount of the added ethylene oxide and propylene oxide to from 10 to 50 moles on average; and (B) an incomplete ester of a polyhydric alcohol, said polyhydric alcohol is selected from the group consisting of ethylene glycol, propylene glycol, glycerol, diglycerol, triglycerol, trimethylolpropane, pentaerythritol and sorbitol, to which ethylene oxide and propylene oxide have been added in such a manner as to control the molar ratio of ethylene oxide/propylene oxide to from 1 to 4 and to control the total amount of the added ethylene oxide and propylene oxide to from 10 to 50 moles per OH group on average, and a higher fatty acid having 8 to 22 carbon atoms, wherein the compound (A) and the incomplete ester (B) have a molecular weight of from 800 to 40,000 and the incomplete ester (B) has a degree of esterification of from 30 to 90%.

2. A deinking agent for regenerating waste paper as claimed in claim 1, wherein the molecular weight of said reaction product is from 950 to 40,000.

* * * * *